(12) United States Patent
Griffin

(10) Patent No.: US 7,925,169 B2
(45) Date of Patent: Apr. 12, 2011

(54) PHOTONIC ENCODER

(75) Inventor: Robert Griffin, Towcester (GB)

(73) Assignee: Oclaro Technology Limited, Towcester (GB)

( * ) Notice: Subject to any disclaimer, the term of this patent is extended or adjusted under 35 U.S.C. 154(b) by 1734 days.

(21) Appl. No.: 10/497,238

(22) PCT Filed: Nov. 29, 2002

(86) PCT No.: PCT/GB02/05386
§ 371 (c)(1),
(2), (4) Date: Jun. 1, 2004

(87) PCT Pub. No.: WO03/049331
PCT Pub. Date: Jun. 12, 2003

(65) Prior Publication Data
US 2005/0180682 A1 Aug. 18, 2005

(30) Foreign Application Priority Data
Nov. 30, 2001 (GB) .................................. 0128786.1

(51) Int. Cl.
H04B 10/04 (2006.01)
(52) U.S. Cl. .......................... 398/190; 398/186; 398/188
(58) Field of Classification Search .......... 398/182–191, 398/193–194
See application file for complete search history.

(56) References Cited

U.S. PATENT DOCUMENTS

| | | | |
|---|---|---|---|
| 4,847,477 A * | 7/1989 | Smith | 250/201.9 |
| 4,893,352 A | 1/1990 | Welford | |
| 5,222,103 A | 6/1993 | Gross | |
| 5,907,421 A * | 5/1999 | Warren et al. | 398/188 |
| 6,341,023 B1 * | 1/2002 | Puc | 398/79 |
| 6,407,845 B2 * | 6/2002 | Nakamoto | 359/239 |
| 6,407,846 B1 * | 6/2002 | Myers et al. | 359/239 |
| 6,421,155 B1 * | 7/2002 | Yano | 398/183 |
| 6,628,849 B2 * | 9/2003 | Yap et al. | 385/3 |
| 2002/0196508 A1 * | 12/2002 | Wei et al. | 359/183 |
| 2004/0028418 A1 * | 2/2004 | Kaplan et al. | 398/188 |

FOREIGN PATENT DOCUMENTS

| | | |
|---|---|---|
| EP | 0 748 069 A2 | 12/1996 |
| EP | 0 938 197 A2 | 8/1999 |
| GB | 2 361 071 A | 10/2001 |
| GB | 2 364 790 A | 2/2002 |
| GB | 2 370 473 A | 6/2002 |
| WO | WO-01/08336 A1 | 2/2001 |

OTHER PUBLICATIONS

Djupsjoebacka, Anders, "Residulal Chirp in Integrated-Optic Modulators," IEEE Photonics Technology Letters, vol. 4 (1):41-43 (1992).
Kodama Y. et al.: "Analytical theory of guiding-center nonreturn-to-zero and return-to-zero signal transmission in normally dispersive nonlinear optical fibers"; Optics Letters, Optical Society of America, Washington, US, vol. 20, No. 22, Nov. 15, 1995, pp. 2291-2293, XP002230089 abstract p. 2292, paragraph 2-p. 2293, paragraph 1.

(Continued)

Primary Examiner — Dzung D Tran
(74) Attorney, Agent, or Firm — Nelson Mullins Riley & Scarborough LLP; Anthony A. Laurentano

(57) ABSTRACT

A modulator arrangement for modulating an optical signal using a differential quadrature phase shift key for use in an optical wavelength division multiplex (WDM) optical communications system comprising a laser for producing an optical signal of a selected wavelength, which signal is split by a splitter (4), each part of said split signal being applied to a respective phase modulator (6, 8). The phase modulators (6, 8) are adapted to modulate the phase of the signal in dependence on a respective drive voltage and the phase of the output of at least one modulator is shiftable. The split signals are recombined by an optical recombiner (12) to form an optical phase shift key output. The arrangement further comprises a phase modulator (20) adapted to chirp the optical phase shift key output.

6 Claims, 2 Drawing Sheets

OTHER PUBLICATIONS

Murakami M. et al.: "Transoceanic twelve 10 Gbit/s WDM signal transmission experiment with individual channel dispersion-and-gain compensation and prechirped RZ pulse format"; Electronics Letters, IEE Stevenage, GB, vol. 33, No. 25, Dec. 4, 1997, pp. 2145-2146, XP006008255, ISSN: 0013-5194 abstract p. 2145, paragraph 3, figure 1.

* cited by examiner

PHOTONIC ENCODER

RELATED APPLICATIONS

This application is a 35 U.S.C. 371 national stage filing of International Application No. PCT/GB02/05386, filed 29 Nov. 2002, which claims priority to Great Britain Patent Application No. 0128786.1 filed on 30 Nov. 2001, in Great Britain. The contents of the aforementioned applications are hereby incorporated by reference.

BACKGROUND OF THE INVENTION

The invention relates to a method and apparatus for encoding an optical signal having improved dispersion tolerance in a wavelength division multiplex (WDM) optical communications system.

In this specification the term "light" will be used in the sense that it is used generically in optical systems to mean not just visible light but also electromagnetic radiation having a wavelength between 800 nanometres (nm) and 3000 nm. Currently the principal optical communication wavelength bands are centred on 1300 nm, 1550 nm (C-Band) and 1590 nm (L-Band), with the latter bands receiving the majority of attention for commercial exploitation.

Exemplary WDM systems operating in the 1550 nm C-Band optical fibre communication band are located in the infrared spectrum with International Telecommunication Union (ITU) 200, 100 or 50 GHz channel spacing (the so called ITU Grid) spread between 191 THz and 197 THz.

With ongoing developments in optically amplified dense wavelength division multiplex (DWDM) optical links as the backbone of point-to-point information transmission and the simultaneous increase in bit rate applied to each wavelength and the simultaneous increase in the number of channels, the finite width of the erbium gain window of conventional erbium-doped optical amplifiers (EDFAs) could become a significant obstacle to further increases in capacity. Conventional EDFAs have a 35 nm gain bandwidth which corresponds to a spectral width of 4.4 THz. System demonstrations of several Tbit/s data rate are already a reality and the spectral efficiency, characterised by the value of bit/s/Hz transmitted, is becoming an important consideration. Currently, high-speed optical transmission mainly employs binary amplitude keying, using either non-return-to-zero (NRZ) or return-to-zero (RZ) signalling formats, in which data is transmitted in the form of binary optical pulses, i.e. on or off.

In WDM several factors limit the minimum channel spacing for binary amplitude signalling, and in practice spectral efficiency is limited to ~0.3 bit/s/Hz. Although increasing the per-channel bit rate tends to reduce system equipment, there are several problems that need to be overcome for transmission at bit rates above 10 Gbit/s; these being:

- dispersion management of the optical fibre links, this becomes increasingly difficult with increased bit rate;
- Polarisation mode dispersion (PMD) in the optical fibre causes increased signal degradation;
- Realisation of electronic components for multiplexing, de-multiplexing and modulator driving becomes increasingly difficult.

One technique which has been proposed which allows an improvement of spectral efficiency is the use of quadrature phase shift keying (QPSK) [S. Yamazaki and K. Emura, (1990) "Feasibility study on QPSK optical heterodyne detection system", J. Lightwave Technol., vol. 8, pp. 1646-1653]. In optical QPSK the phase of light generated by a transmitter laser is modulated either using a single phase modulator (PM) driven by a four-level electrical signal to generate phase shifts of 0, $\pi/2$, $\pi$ or $3\pi/2$ representative of the four data states, or using two concatenated phase modulators which generate phase shifts of 0 or $\pi/2$ and $\pi$ or $3\pi/2$ respectively. A particular disadvantage of QPSK is that demodulation requires, at the demodulator, a local laser which is optically phase-locked to the transmitter laser. Typically this requires a carrier phase recovery system. For a WDM system a phase-locked laser will be required for each wavelength channel. It further requires adaptive polarisation control which, in conjunction with a phase recovery system, represents a very high degree of complexity. Furthermore, systems that require a coherent local laser are sensitive to cross-phase modulation (XPM) in the optical fibre induced by the optical Kerr non-linearity, which severely restricts the application to high capacity DWDM transmission.

It has also been proposed to use differential binary phase shift keying (DBPSK) [M Rohde et al (2000) "Robustness of DPSK direct detection transmission format in standard fibre WDM systems", Electron. Lett., vol. 36]. In DBPSK data is encoded in the form of phase transitions of 0 or $\pi$ in which the phase value depends upon the phase of the carrier during the preceding symbol interval. A Mach-Zehnder interferometer with a delay in one arm equal to the symbol interval is used to demodulate the optical signal. Although DBPSK does not require a phase-locked laser at the receiver it does not provide any significant advantages compared to conventional amplitude NRZ signalling.

U.S. Pat. No. 6,271,950 discloses a differential phase shift keying optical transmission system, comprising a laser to generate an optical signal, a delay encoder to provide a different delay for each of M input channels and an M channel phase modulator which phase modulates the optical carrier signal with each of the differently delayed M input signal channels to form a time division multiplex (TDM) phase modulated optical signal.

However, in modern communication systems, the rate of development dictates that typically data streams multiply up by a factor of 4 every few years. At the time of application the proposed standard installation will use data streams of 10 Gbit/s and systems of 40 Gbit/s have been demonstrated. In addition to the matters discussed above, the practical problem then arises that new systems operating at high speeds have to co-operate with older systems.

SUMMARY OF THE INVENTION

The present invention seeks to provide an encoder for an optical signal having improved dispersion tolerance.

According to the invention, there is provided a modulator arrangement for modulating an optical signal using a differential quadrature phase shift key for use in an optical wavelength division multiplex (WDM) optical communications system comprising a laser for producing an optical signal of a selected wavelength, which signal is split by a splitter, each part of said split signal being applied to a respective phase modulator, each of which phase modulators is adapted to modulate the phase of the signal in dependence on a respective drive voltage, the phase of the output of at least one modulator being shiftable, the split signals being recombined by an optical recombiner to form an optical phase shift key output, wherein the arrangement further comprises means adapted to chirp the optical phase shift key output.

In this context, chirping relates to the variation of an optical signal's phase modulation: amplitude modulation ratio. Chirping the optical PSK output modifies the evolution of the optical signal along a length of dispersive fibre. Surprisingly, applying chirp to the phase modulated signal external to the phase modulators does not result in any significant corruption of the data signal and reduces the need for chromatic dispersion compensation that would otherwise be required. For short haul systems operating at 10 Gbit/s, a chirped optical PSK signal can be transmitted up to around 300 km before any chromatic dispersion compensation is required in contrast to the known prior art systems where compensation is usually required after about 80 km.

Preferably, the arrangement comprises a phase modulator adapted to chirp the optical PSK output. Preferably, the phase modulator applies a π/4 phase modulation to the output signal. Preferably, the phase modulator is driven by a oscillator which is phase locked with the data streams. Preferably, the phase modulator comprises an electrode over a waveguide through which the optical output propagates. Preferably, the system is used with 10 Gbit/s data streams.

BRIEF DESCRIPTION OF THE DRAWINGS

An exemplary embodiment of the invention will now be described in greater detail with reference to the drawing in which.

DESCRIPTION OF ILLUSTRATED EMBODIMENT

Figure 1:
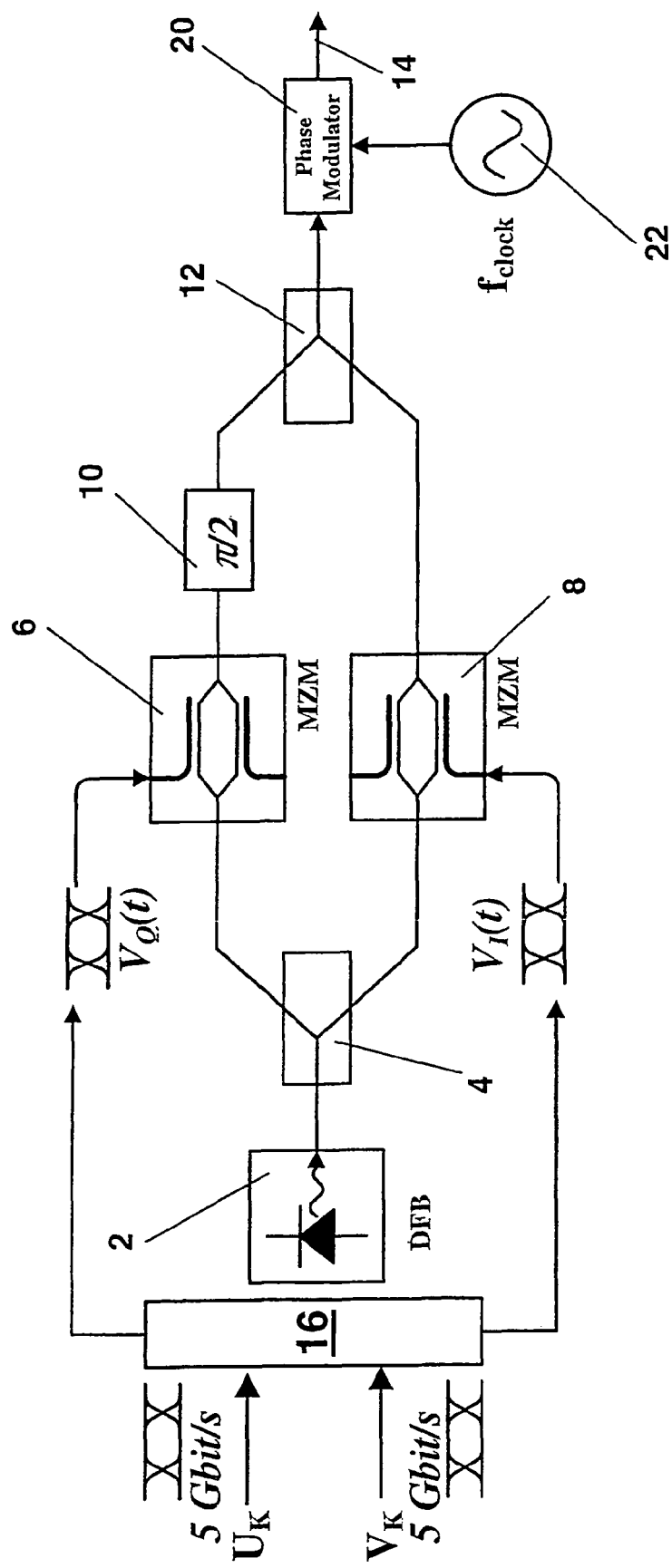
FIG. 1 shows a modulator arrangement.

Referring to FIG. 1 there is shown an optical phase shift key modulator arrangement in accordance with the invention for encoding two 5 Gbit/s NRZ data streams $U_k$, $V_k$ onto a single optical carrier. Typically the modulator arrangement would be used as part of a transmitter in a WDM optical communications system with a respective modulator arrangement for each WDM wavelength channel.

The modulator arrangement comprises a single frequency laser 2, for example a distributed feedback (DFB) semiconductor laser due to its stable optical output for a given wavelength, which is operated to produce an unmodulated optical output of a selected wavelength, typically a WDM wavelength channel. Light from the laser is divided by an optical splitter 4 into two parts and each part is applied to a respective phase modulator 6, 8. Each phase modulator 6, 8 is configured such that it selectively modulates the phase by 0 or π radians in dependence upon a respective binary (bipolar) NRZ drive voltage $V_I(t)$, $V_Q(t)$. In the preferred arrangement illustrated in FIG. 1 the phase modulators 6, 8 each comprise a Mach-Zehnder electro-optic modulator (MZM) which is fabricated for example in gallium arsenide or lithium niobate. As is known MZMs are widely used as optical intensity modulators and have an optical transmission versus drive voltage characteristic which is cyclic and is generally raised cosine in nature. The half period of the MZM's characteristic, which is measured in terms of a drive voltage, is defined as $V_\pi$. Within the modulator arrangement of the present invention each MZM 6, 8 is required to operate as a phase modulator without substantially affecting the amplitude (intensity) of the optical signal. To achieve this each MZM 6, 8 is biased for minimum optical transmission in the absence of a drive voltage and is driven with a respective drive voltage $V_I(t)$, $V_Q(t)=\pm V_\pi$ to give abrupt phase shifting with a minimum of amplitude modulation. The two phase modulators 6, 8 have matched delays (phase characteristics).

The optical output from the phase modulator 6 is passed through a phase shifter 10 which effectively applies a phase shift of π/2 such that the relative phase difference between the optical signals passing along the path containing the modulator 6 and that passing along the path containing the modulator 8 is ±π/2. The optical signals from the phase shifter 10 and phase modulator 8 are recombined by an optical recombiner 12, to form an optical phase shift key (PSK) output 14. The splitter 4 comprises a 1×2 MMI (multimode interference coupler) and recombiner 12 comprises a 2×2 MMI. The two MMIs co-operate to provide a phase shift to the signal of about π/2. A control electrode is then used to provide the fine control. There are of course alternative methods of obtaining a π/2 shift in one of the arms, such as using a control electrode to provide the entire shift. When using GaAs technology, MMIs are etched into the epitaxial layer, which etch is deeper than the cut for the main waveguide.

A further phase modulator 20 is provided after the recombiner 12 to chirp the optical PSK output 14, which phase modulator 20 is driven at a clock rate corresponding to the data line rate. For example in a 10 Gbit/s QPSK system, the clock rate is 5 GHz. The oscillator 22 which provides the 5 GHz clock rate must be synchronous with the data clock rate, i.e. it should be phase locked with the data stream. At these clock speeds, there is a delay of several symbol periods between the precoder and the output, so the phase of the clock signal applied to the phase modulator 20 should be adjusted to match.

The phase modulator 20 comprises a single electrode over the waveguide, which arrangement will minimise insertion losses. The modulator 20 needs to be external to the MZIs 6, 8 to avoid corruption of the phase modulated data signal.

The phase modulator drive voltages $V_I(t)$, $V_Q(t)$ are generated by pre-coding circuitry 16 in dependence upon the two binary data streams $U_k$, $V_k$. According to the modulator arrangement of the present invention the two data streams $U_k$, $V_k$ are differentially encoded such that these data are encoded onto the optical signal 14 in the phase transition (changes) rather than in the absolute phase value. The optical signal 14 is differential quadrature phase shift key (DQPSK) encoded.

The DQPSK optical signal 14 is ideally given by $E_0 \exp(i\omega t+\theta+\theta_i)$, where ω is the mean optical angular frequency, t is time, θ the carrier phase and $\theta_i$ a data dependent phase modulation for the i-th data symbol $d_i$. In the general case $d_i \epsilon \{0, 1, \ldots M-1\}$ and for quarternary phase shift keying M=4, that is the data symbol has four values. The phase modulation term is given by $\theta_i=\theta_{i-1}+\Delta\theta_i (d_i)$ in which $\theta_{i-1}$ is the phase term for the previous data symbol $d_{i-1}$ and $\Delta\theta_i$ the change in phase between the i-$_j$ and i-th data symbols. The relationship between data symbol $d_i$ and phase shift $\Delta\theta_i$ for QPSK is tabulated below.

TABLE 1

Values of data $U_k$, $V_k$, data symbol $d_i$ and phase change $\Delta\theta_i(d_i)$ for DQPSK.

| $U_k$ | $V_k$ | $d_i$ | $\Delta\theta_i (d_i)$ |
|---|---|---|---|
| 0 | 0 | 0 | 0 |
| 0 | 1 | 1 | π/2 |
| 1 | 0 | 2 | π |
| 1 | 1 | 3 | 3π/2 |

Figure 2:
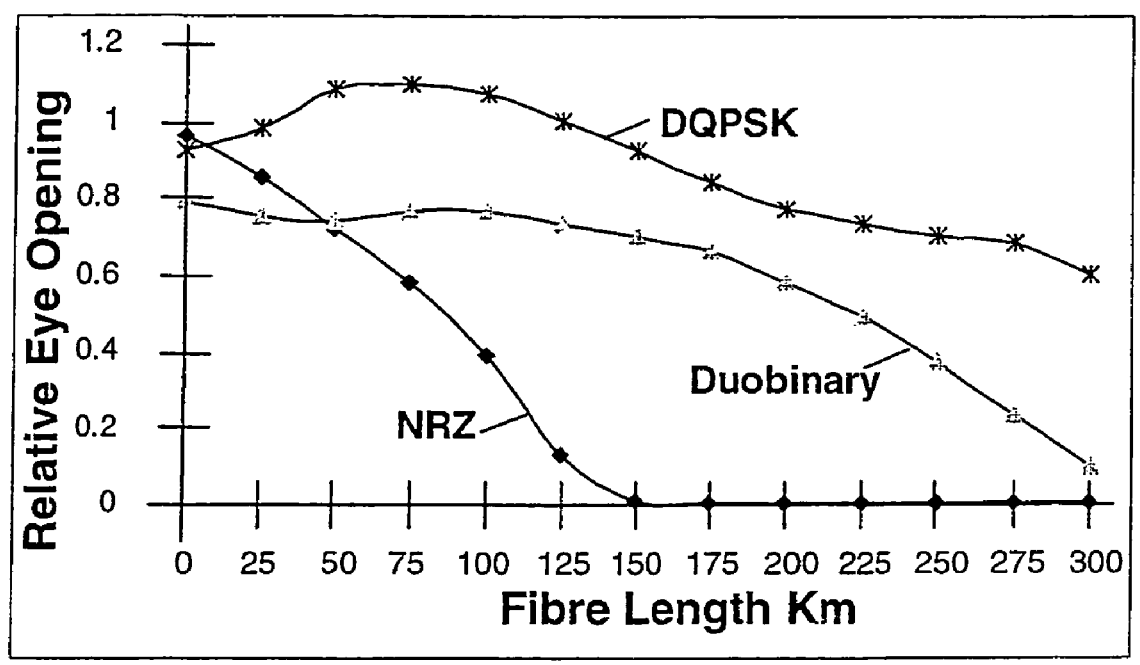
FIG. 2 shows comparative graphs of eye opening against fibre length

FIG. 2 shows a comparative graph of the relative eye opening against fibre length for a conventional NRZ amplitude signal, a phase modulated differential binary PSK signal and a differential quadrature PSK signal for a 10 Gbit/s data rate.

As the graph shows a conventional NRZ amplitude signal degrades steadily with fibre length and has an effective useful length of between 75 and 100 km. The duobinary signal is better having a useful length of around 250 km. In contrast the phase modulated differential quadrature signal according to the invention has an effective length of in excess of 300 km.

The invention claimed is:

1. A modulator arrangement for modulating an optical signal using a differential quadrature phase shift key for use in an optical wavelength division multiplex (WDM) optical communications system, comprising a laser for producing an optical signal of a selected wavelength, which signal is split by a splitter, each part of said split signal being applied to a respective phase modulator, each of which phase modulators is adapted to modulate only a phase of the signal in dependence on a respective drive voltage without substantially affecting the amplitude of the signal, the phase of an output of at least one modulator being shiftable, the split signals being recombined by an optical recombiner to form an optical phase shift key output, and means for chirping the optical phase shift key (PSK) output.

2. The modulator arrangement according to claim 1, wherein the means for chirping comprises a phase modulator adapted to chirp the optical PSK output.

3. The modulator arrangement according to claim 2, wherein the phase modulator applies a $\pi/4$ phase modulator to the output signal.

4. The modulator arrangement according to claim 2, wherein the phase modulator is driven by an oscillator which is phase locked with one or more data streams.

5. The modulator arrangement according to claim 2, wherein the phase modulator comprises an electrode over a waveguide through which the optical output propagates.

6. The modulator arrangement according to claim 1, wherein the system is used with one or more 10 Gbit/s data streams.

* * * * *